(12) United States Patent
Dooley et al.

(10) Patent No.: US 6,729,068 B2
(45) Date of Patent: May 4, 2004

(54) ENGINEERED WOOD-BASED MULCH PRODUCT

(75) Inventors: James H. Dooley, Federal Way, WA (US); Justin T. Maschhoff, Tacoma, WA (US)

(73) Assignee: Forest Concepts LLC, Federal Way, WA (US)

(*) Notice: Subject to any disclaimer, the term of this patent is extended or adjusted under 35 U.S.C. 154(b) by 32 days.

(21) Appl. No.: 10/225,387

(22) Filed: Aug. 21, 2002

(65) Prior Publication Data

US 2004/0035048 A1 Feb. 26, 2004

(51) Int. Cl.[7] .............................................. A01G 7/00
(52) U.S. Cl. ............................................................. 47/9
(58) Field of Search .......................... 47/9; 428/15, 17, 428/18

(56) References Cited

U.S. PATENT DOCUMENTS

| 3,870,583 A | * | 3/1975 | Gidge | 156/500 |
| 5,192,587 A | * | 3/1993 | Rondy | 427/212 |
| 5,301,460 A | | 4/1994 | Pelton et al. | 47/9 |
| 5,788,790 A | * | 8/1998 | Andrew | 156/64 |

FOREIGN PATENT DOCUMENTS

| EP | 438062 A | * | 7/1991 | ............ A01C/1/04 |
| JP | 406284815 A | * | 10/1994 | ............ A01G/1/00 |

OTHER PUBLICATIONS

Buchanan, J. R., . C. Yoder, and J. L. Smoot. Controlling erosion on construction sites with steep slopes with wood chips. Paper No. 002060, Presented at American Society of Agriculture Engineers Meeting, Jul. 9–12, 2000, Milwaukee, Wisconsin.

Pannkuk, C. D., P. R. Robichaud, and R. E. Brown . Effectiveness of needle cast from burnt conifer trees on reducing erosion. Paper No. 005018, Presented at American Society of Agriculture Engineers Meeting, Jul. 9–12, 2000, Milwaukee, Wisconsin.

* cited by examiner

Primary Examiner—Son T Nguyen
(74) Attorney, Agent, or Firm—Keith D. Gehr

(57) ABSTRACT

An engineered wood based soil mulch product is described that is a blend of geometrically regular wood elements. The blend has at least two components that differ by at least one dimension. Element length is within the range of about 50–300 mm with a maximum width of about 30 mm. The product is preferably formed from wood veneer having a maximum thickness of about 7.5 mm. Individual elements may be formed as long strands, as rectangles, other polygons, or with curvilinear edges. Mixtures of elements having differing geometric form are acceptable and in some cases advantageous. The product has the advantages of long life, greater stability over time, and freedom of seeds from any foreign plant species

12 Claims, 3 Drawing Sheets

ENGINEERED WOOD-BASED MULCH PRODUCT

The present invention is an engineered wood-based product that is highly effective as a long lasting mulch for prevention of soil erosion.

BACKGROUND OF THE INVENTION

Siltation of spawning streams from road construction and logging has been a major cause of the decrease of salmon runs in the streams of both western and northeastern United States. Considerable emphasis is now being placed on prevention of erosion from construction projects of almost any size. Logging clear cuts have been greatly restricted in size. Road construction is now carefully engineered to control run-off from rain. Even the smallest construction jobs must now use some sort of erosion control to prevent ultimate soil transport from disturbed land into the closest stream.

In order to prevent erosion it is common practice to apply organic mulches to disturbed surfaces. These maybe of fugitive nature; i.e., those that quickly decay, or they may be more permanent, lasting one or more years. Wheat straw is one of the former type that is widely used while wood chips are typical of the more durable mulches. Short duration mulches are often applied to hold grass seed in place until it germinates and becomes established. These are often based on wood fiber and are usually applied using so-called hydroseeding.

There are both advantages and disadvantages to each of the above types. Straw often carries seeds that may introduce undesirable plant species into an area. As noted, it is short lived and it tends to be displaced by rain runoff when strewn on steeper slopes. It may also carry pesticide residues that can contaminate nearby streams. Wood chips tend to be readily carried away by slope wash. Other types, such as burlap or similar materials, are expensive both in initial and application costs.

Wood chips or comminuted wood have been proposed in the past as a mulch material. Corbett, in U.S. Pat. No. 5,301,460, describes a wood based mulch produced by passing whole wood through a swing hammer mill. This is the type commonly used for reducing waste wood for use as fuel, a product typically called "hog fuel". The mulch is said to have " . . . a shredded fine portion, a bulky portion, and a stringy binding portion". The stringy binder appears to be key to distinguishing it from other types of wood based materials since it is said to remain on top and form the mulch into a mat after the fines have sunk to the bottom.

Buchanan et al., in a paper presented at a July 2000 meeting of the American Society of Agricultural Engineers in Milwaukee, Wis. (Paper 002060), explored the use of various sizes of wood chips on a relatively steep slope of an erodible soil. They found that small chips were not very effective but that a mixture of chip sizes gave better protection than either small or large chips.

Pannkuk et al., in Paper No. 005018 presented at the same meeting, found that Douglas-fir and ponderosa pine needles applied at a rate of 70% cover on a simulated 40% slope were effective at reducing soil transport. The Douglas-fir needles were somewhat more effective. This was believed to be due to their somewhat greater soil contact than the longer pine needles. Mulches of this type would generally be of relatively short effectiveness due to rapid decay. These authors discuss mechanics of mulches in reducing soil wash including the effects of raindrop impact and surface water transport.

By and large, mulch materials have been selected because they were inexpensive and readily available. Little thought seems to have been given to the possibility of designing a mulch material based on sound engineering, hydraulic, and biological principals. The present invention is such a material.

SUMMARY OF THE INVENTION

The present invention is a mulch material engineered to provide superior soil protection when made and used in accordance with the procedures to be outlined. It is manufactured from wood or wood-like materials and has the properties of relatively long persistence and freedom from seeds that might introduce environmentally undesirable species. The terms "wood-like materials" or "wood based materials" may include products such as heavy paperboard, old corrugated containers, and similar products, and the term "wood" should be read broadly so as to include these. Wood itself is a preferred material. The composition of the product may be varied to meet the particular requirements of climate, slope, or soil type.

Unlike other wood-based mulches, such as fiber, chips, or hog fuel types, the present mulch material is formed from a mixture of at least two components of geometrically regular elements. These components will differ from each other in configuration by length, width or geometric shape. Mixtures of different shapes are acceptable and may, in some cases, be preferred. The individual elements will have a minimum length of about 50 mm and a maximum length of about 300 mm. They are preferably in the range of about 50–250 mm long. The width should be within the range of about 3–30 mm, preferably about 3–16 mm. Thickness of the individual elements should fall within the range of about 2.5–7.5 mm, preferably about 3–6.5 mm. Regardless of the geometric shape or mixture of shapes, about 5–50% of the elements should be longer than the others, preferably by at least 25–50 mm. Greater differences in length are possible.

One preferred geometric shape of the elements is an elongated rectangular parallelepiped. These will be generally of approximately square cross section and will somewhat resemble straws or chop sticks. Other shapes, best described as seen in plan view, are rectangles, elongated diamonds, flattened polygons, or somewhat curvilinear boat shaped pieces.

The product may be made from round wood by sawing, peeling, slicing, shearing, or extrusion through a die. A preferred raw material is lower grades of rotary cut veneer. This may be scrap pieces, often called "fishtails", that are trimmed from veneer sheets to remove defects or taper during plywood or laminated veneer lumber manufacture. Wood species is not critical. Douglas-fir and the southern pines, e.g. loblolly pine, are more readily available in veneer form than other tree species and have been found to serve very well. Aspen, alder, birch, and similar hardwood species are equally usable. These may be shorter lived yet may better promote soil formation.

The product has been used effectively on a variety of soil types, both in laboratory and field tests. A 70% coverage has been found to provide virtually 100% retention in test plots, even on steep slopes. The product can be readily tailored to match soil or slope type. As one example, the longer fraction should be increased on steeper slopes. Areas where intense rainstorms are normal may have a greater percentage of wider elements to minimize soil displacement from the impact of raindrops. For elements of equal surface area, wider elements will have less upslope edge to hold soil particles than will longer, narrower ones. The longer straw-like elements are important, not only for soil retention, but they link all of the elements to assure the integrity and retention of the mulch during storms.

In contrast to other mulch materials, by forming the mulch of the present invention from engineered predetermined geometric shapes its performance is dependable and reproducible in any given environment.

It is an object of the present invention to provide a mulch material that has been designed using sound engineering principles to effect maximum soil retention over time.

It is another object to provide a mulch material that may be tailored in composition to give optimum performance on a variety of soil types and slopes.

It is a further object to provide a mulch material that may be formed from inexpensive grades or scrap pieces of wood veneers.

It is also an object to provide a method of using a wood-based mulch to effect maximum soil retention in a variety of environments.

These and many other objects will become readily apparent upon reading the following detailed description when taken in conjunction with the drawings.

DETAILED DESCRIPTION OF THE PREFERRED EMBODIMENTS

There are many factors that must be considered in designing an engineered mulch. Length and thickness are important since water borne soil particles accumulate against the upslope edge of an individual element. If the element is too thin the soil particles will soon be carried over the top. If too thick, the increased mass per unit results in potential for better coverage is being wasted. Increasing length results in increased knitting and decreased probability or moving on the slope to orient with flow. Longer elements increase the probability of bridging over microtopography allowing flow beneath the unit. Increasing the width gives greater rainfall interception and greater potential for longer term bonding with the underlying soil. However, there is increased potential for blocking seedling emergence and flotation with consequent downslope movement. Greater thickness improves decay life and increases sediment storage capability. But, as noted above, as thickness increases the required mass per unit also increases.

Shape is also critical in determining efficiency since it affects the percentage of an element that can be effectively cross slope. Long narrow strands can be almost 100% cross slope. Rectangles can have their longer dimension cross slope but the shorter dimension would then be down slope. Other configurations; e.g., diamonds curvilinear shapes, or polygons, would have greater or lesser percentages of their perimeter available across slope.

Surface texture also is important. Rougher surfaces will entrap more soil particles than very smooth surfaces.

All of the above considerations have been taken into account in designing the present mulch material. While composition will vary somewhat depending on soil type and slope, a mixture of only strands of varying length or of strands with other configurations such as rectangles has proved to be very effective. A "strand" is defined as a straw-like element having an approximately square cross section and a length from about 10–100 times the thickness.

Reference to the figures will be useful to better understand the composition of the present product and method of its use.

Figure 1:
FIG. 1 shows a long narrow wood component of the mulch.
Figure 2:
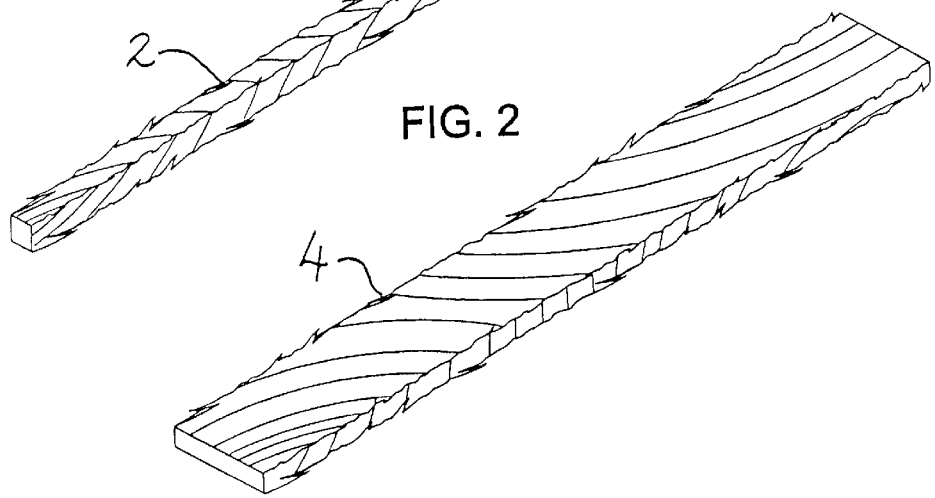
FIG. 2 portrays a wider wood component of the mulch.

FIG. 1 shows a typical wood strand 2. This will typically be about 4–6 mm in cross sectional dimensions and can conveniently be formed from rotary cut veneer. Strands will vary from about 50 mm to 300 mm in length. FIG. 2 shows a rectangular piece 4 cut from veneer of similar thickness. These will typically be about 15 mm in width and of a length within the range of that for the above strands.

Figure 3:
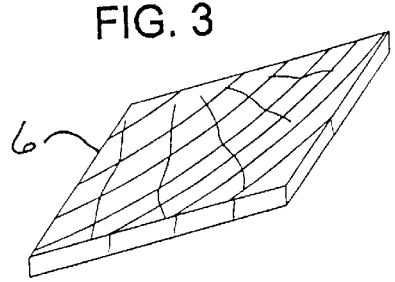
FIGS. 3–5 indicate other geometric forms individual mulch elements.
Figure 4:
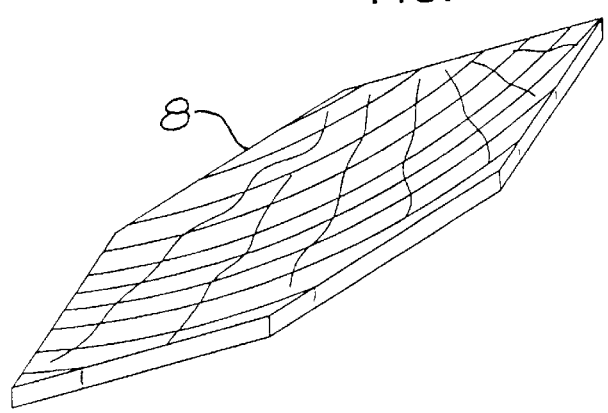
Figure 5:
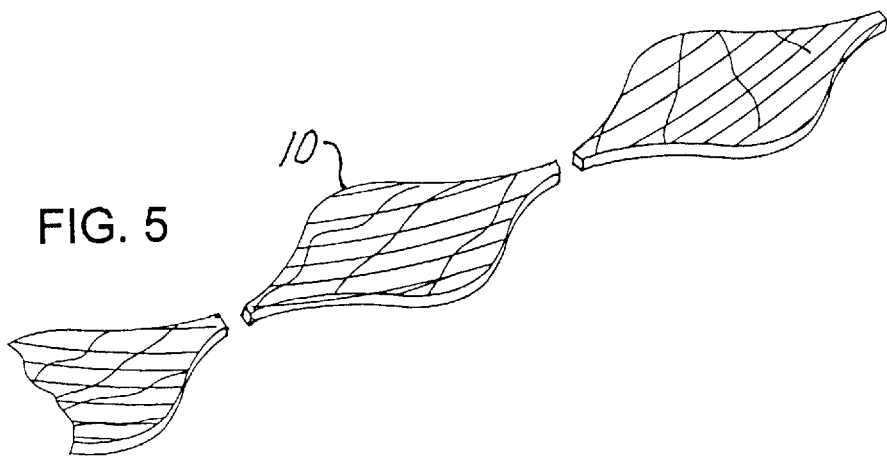

FIGS. 3–5 show several of the other possible mulch element configurations. FIG. 3 portrays diamond shaped elements 6. FIG. 4 shows a polygonal configuration 8, in this case hexagonal. FIG. 5 shows an element 10 having curvilinear edges, in this case sinusoidal. These will all have certain advantages but would generally not be preferred to those shown in FIGS. 1 and 2. Which particular configurations are chosen will depend heavily on the form of the source wood and how it is further processed into the mulch elements. As was stated earlier, rotary cut veneers are a preferred wood source.

Figure 6:
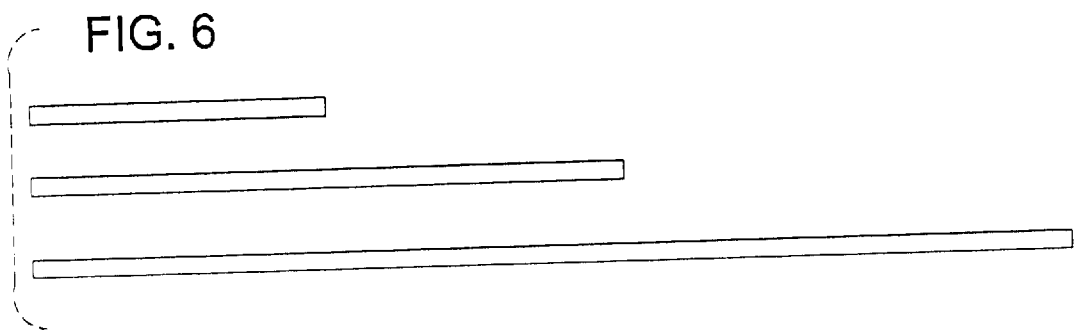
FIG. 6 illustrates a possible mixture of long narrow elements forming one mulch material.
Figure 7:
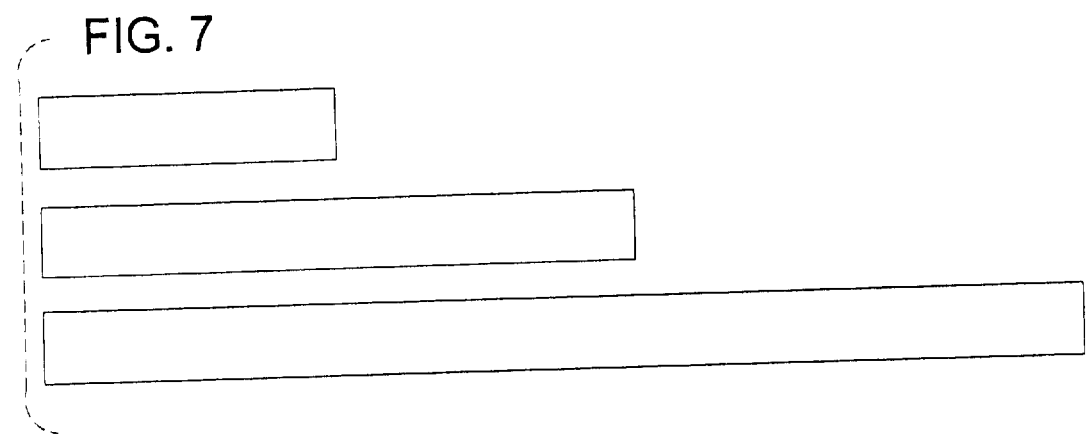
FIG. 7 shows a possible mixture of wider elements forming another mulch material.

FIGS. 6 and 7 represent respectively strands and rectangular elements in a mixture and configuration that approximates the actual sizes that would be used in the mulch material.

Figure 8:
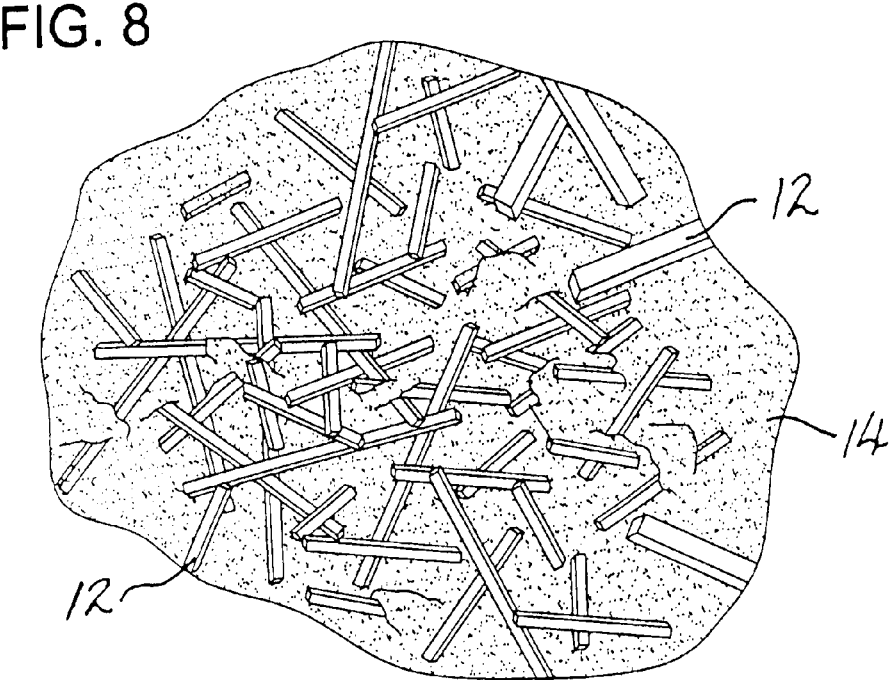
FIG. 8 shows in plan view one mulch composition on a soil surface.

FIG. 8 represents how the product of the invention might appear when the mulch elements 12 are randomly scattered on a soil surface 14. It might be noted that for ease of illustration a lower coverage is shown here than would be used in most instances.

Figure 9:
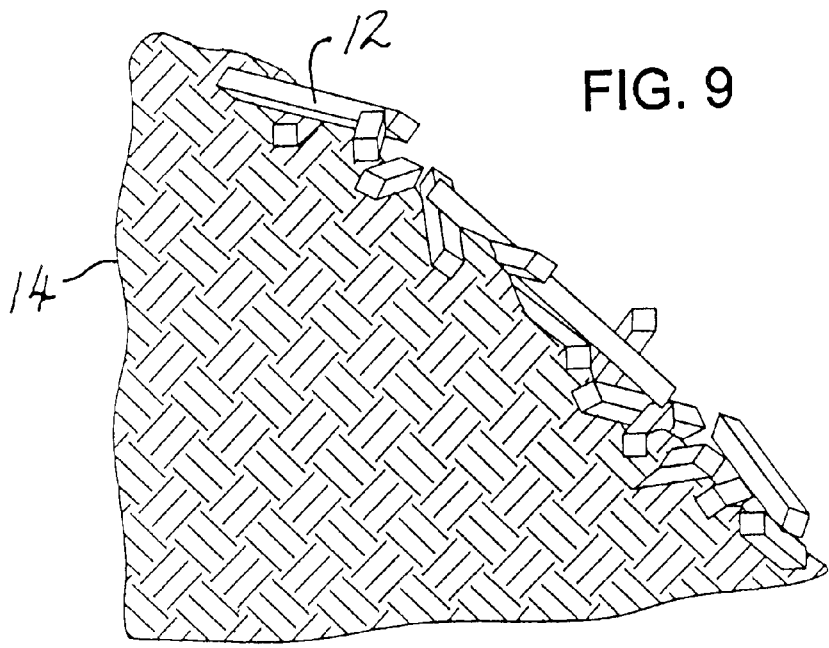
FIG. 9 represents in vertical section the mulch composition on an approximate 100% grade slope.

In FIG. 9 the mulch product is shown in use on a steep slope, shown in cross section. In this case the slope is on an approximately 100% grade (or 45° angle), a condition that is extremely susceptible to erosion.

EXAMPLE 1

A series of experiments was conducted at the United States Forest Service Rocky Mountain Research Station in Moscow, Id., to measure the erosion control efficiency of the mulch product of the present invention. These laboratory experiments were made on sloped soil tables positioned under rainfall simulators. The treatments included (1) bare soil; (2) wood veneer mulch composed of a mixture of 16 mm (⅝in) wide pieces; (3) wood veneer mulch composed of a mixture of 4 mm (3/16in) wide pieces; and (4) agricultural straw. The 16 mm wide pieces were made from Douglas-fir veneer that was 3.2 mm (0.125 in) thick. Each sample included equal areas of pieces cut to 60, 120, and 240 mm long (2.4, 4.7. and 9.4 in). Stated otherwise, there were four times as many 60 mm pieces as 240 mm long pieces or twice as many 60 mm pieces as 120 mm long pieces in each sample. The 4 mm wide sample was formed from Douglas-fir veneer 4.2 mm (0.166 in) thick. The lengths and blend were the same as for the 16 mm wide sample. All mulch materials were applied to give an estimated 70% ground coverage.

The experiments were conducted on an erosion prone granitic soil with the table set to a 40% slope. Plots were 1.25 m (49 in) wide by 4 m (157 in) long. Simulated rainfall events began with 50 mm (2 in) per hour for 15 minutes. This was immediately followed using the same rainfall rate plus 1 L/min (1.05 qt/min) added overland flow for five minutes. The same rainfall rate was continued but the overland flow was then increased to 4 L/min (1.2 gal/min) for an additional five minutes. The experiment was replicated three times for each condition and results averaged.

Sediment and runoff collected at the lower end of the table was measured during each experimental run. The total amount of sediment that resulted from each treatment was oven dried and weighed. Table 1 shows the results.

TABLE 1

| Treatment | Sediment Collected, kg | Erosion Control, % |
|---|---|---|
| Bare Soil | 29.4 (11.3)* | 0 |
| 16 mm wide mulch | 0.4 (0.26) | 99 |
| 4 mm wide mulch | 0.6 (0.52) | 98 |
| Straw | 0.5 (0.39) | 98 |

*Standard Deviation is given in parentheses.

The wood-based mulch treatments were equivalent in efficacy to the straw. However, they have the advantages stated earlier of much longer life, greater stability over time, and freedom from foreign weed species.

EXAMPLE 2

An experiment was conducted on a different rainfall simulator to assess the performance of a blend of the wood-based mulch product. This was done using a soil table 1 m wide and 2 m long and set at a 30% slope angle. The soil was a highly erosive silt loam from western Washington State. The blended mulch was applied to cover about 74% of the exposed soil surface. Mulch was again formed from Douglas-fir veneer and made up of fractions 6 mm and 12 mm wide, each having pieces 60 mm, 120 mm, and 240 mm long. Rainfall was simulated at 50 mm (2 in) per hour for a duration of 15 minutes. Table 2 shows the percentage of each component in the blend.

TABLE 2

| Width, mm | Length, mm | Mass/m$^2$, g | Weight %/m$^2$ | Count/m$^2$ |
|---|---|---|---|---|
| 6 | 60 | 122 | 8 | 185 |
| 6 | 120 | 144 | 17 | 185 |
| 6 | 240 | 122 | 8 | 46 |
| 12 | 60 | 244 | 17 | 185 |
| 12 | 120 | 488 | 33 | 185 |
| 12 | 240 | 244 | 17 | 46 |
| Total | | 1464 | 100 | 831 |

Three rainfall replications were made on the mulched soil and compared with a single test for the bare soil. Sediment was collected and the averaged results are given in table 3.

TABLE 3

| Treatment | Coarse Sediment, g | Fine Sediment, g | Total Sediment, g | Reduction, % |
|---|---|---|---|---|
| Bare Soil | 1298 | 392 | 1690 | — |
| Mulched Soil | 87 (80)* | 60 (37) | 147 (116) | 87 |

*Standard deviation is given in parentheses

Even considering the variability between runs of the mulch covered soil, the excellent protection given by the mulch on this erosive soil type is clearly evident from the above results.

Having thus set out the best mode presently known for making and using the invention, it will be apparent that many minor variations might be made that have not been described or exemplified. It is the intention of the inventors that these variations should considered a part their invention if encompassed within the scope of the following claims.

What is claimed is:

1. A wood based mulch product which comprises a blend of wood elements having defined geometric shapes containing a mixture of at least two components which differ by at least one dimension, the elements having a length within the range of about 50–300 mm, a maximum width of about 30 mm, and a maximum thickness of about 7.5 mm.

2. The wood-based mulch product of claim 1 in which at least a portion of the elements have a configuration that is essentially an elongated rectangular parallelepiped.

3. The wood-based mulch product of claim 1 in which at least a portion of the elements have a plan view configuration that is essentially diamond shaped.

4. The wood-based mulch product of claim 1 in which at least a portion of the elements have a plan view configuration that is essentially polygonal.

5. The wood-based mulch product of claim 1 in which at least a portion of the elements have a plan view edge configuration that is curvilinear.

6. The wood-based mulch product of claim 1 in which the elements have a length between about 50–300 mm, a width in the range of about 3–30 mm, and a thickness in the range of about 2.5–7.5 mm.

7. The wood-based mulch product of claim 1 in which the at least two components differ by length, width, or geometric shape.

8. The wood-based mulch product of claim 7 in which 5–50% of the elements differ in configuration by length.

9. The wood-based mulch product of claim 1 in which the elements lave a length in the range of 20–300 times their thickness.

10. The wood based mulch product of claim 1 which is a mixture of differing geometric shapes.

11. The method of preventing soil erosion which comprises applying to the soil surface a wood-based mulch product which comprises a blend of geometrically regular wood elements containing at least two components which differ at least by one dimension, the elements having a maximum length of about 300 mm, a maximum width of about 30 mm, and a maximum thickness of about 7.5 mm.

12. The method of claim 11 in which the mulch product is applied to the soil surface so as to give at least about 70% coverage.

* * * * *